United States Patent
Cantley et al.

(10) Patent No.: US 10,217,084 B2
(45) Date of Patent: Feb. 26, 2019

(54) SYSTEM FOR PROCESSING RESOURCE DEPOSITS

(71) Applicant: Bank of America Corporation, Charlotte, NC (US)

(72) Inventors: Kerry Michelle Cantley, Fort Mill, SC (US); James Wayland Pierce, Jr., Cornelius, NC (US); David Joseph Koval, Charlotte, NC (US); Gary L. Best, Jr., Acworth, GA (US); Kristy Lynn Monk, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 15/598,583

(22) Filed: May 18, 2017

(65) Prior Publication Data

US 2018/0336511 A1    Nov. 22, 2018

(51) Int. Cl.
*G06Q 10/00* (2012.01)
*G06Q 10/08* (2012.01)
*G06K 7/10* (2006.01)
*G07C 9/00* (2006.01)
*B65D 55/06* (2006.01)

(52) U.S. Cl.
CPC .......... *G06Q 10/087* (2013.01); *B65D 55/06* (2013.01); *G06K 7/10762* (2013.01); *G07C 9/00896* (2013.01)

(58) Field of Classification Search
CPC .................................................. G06Q 10/087
See application file for complete search history.

(56) References Cited

U.S. PATENT DOCUMENTS

| | | |
|---|---|---|
| 2,612,092 A | 9/1952 | Heyer et al. |
| 3,618,059 A | 11/1971 | Allen |
| 3,767,080 A | 10/1973 | Erickson |
| 4,113,140 A | 9/1978 | Graef et al. |
| 4,186,477 A | 2/1980 | Bunch et al. |
| 4,313,601 A | 2/1982 | Graef et al. |
| 4,352,097 A | 9/1982 | Hamann et al. |
| 4,369,360 A | 1/1983 | Tsuji et al. |
| 4,443,692 A | 4/1984 | Nishimura |
| 4,622,456 A | 11/1986 | Naruto et al. |
| 4,784,274 A | 11/1988 | Mori et al. |
| 4,802,325 A | 2/1989 | Duncan |
| 4,820,909 A | 4/1989 | Kawauchi et al. |
| 4,910,944 A | 3/1990 | Segalowitz et al. |
| 4,992,648 A | 2/1991 | Hutchison et al. |
| 5,022,531 A | 6/1991 | Horino et al. |
| 5,340,967 A | 8/1994 | Martin et al. |
| 5,411,249 A | 5/1995 | Zouzoulas et al. |
| 5,453,601 A | 9/1995 | Rosen et al. |
| 5,529,208 A | 6/1996 | Carstens et al. |
| 5,533,605 A | 7/1996 | Mays et al. |
| 5,561,281 A | 10/1996 | Eda et al. |
| 5,606,157 A | 2/1997 | Awatsu et al. |
| 5,680,472 A | 10/1997 | Conant et al. |
| 5,689,240 A | 11/1997 | Traxler et al. |
| 5,748,906 A | 5/1998 | Sandig |
| 5,748,908 A | 5/1998 | Yu et al. |
| 5,813,510 A | 9/1998 | Rademacher |
| 5,900,607 A | 5/1999 | Awatsu et al. |
| 5,931,634 A | 8/1999 | Neri et al. |
| 5,936,220 A | 8/1999 | Hoshino et al. |
| 5,952,639 A | 9/1999 | Ohki et al. |
| 5,952,920 A | 9/1999 | Braddick et al. |
| 5,953,423 A | 9/1999 | Rosen et al. |
| 5,963,131 A | 10/1999 | D'Angelo et al. |
| 5,996,314 A | 12/1999 | Pennini et al. |
| 6,014,649 A | 1/2000 | Kobayashi et al. |
| 6,021,397 A | 2/2000 | Jones et al. |

(Continued)

FOREIGN PATENT DOCUMENTS

| | | |
|---|---|---|
| DE | 4019265 C1 | 11/1991 |
| DE | 4429815 A1 | 2/1996 |

(Continued)

OTHER PUBLICATIONS

International Search Report and Written Opinion from corresponding PCT Application No. PCT/US2009/047452 dated Aug. 25, 2009.
European Search Report in EP09007879 dated Oct. 1, 2009.
European Search Report in EP09007878 dated Oct. 1, 2009.
International Preliminary Report on Patentability for International Application No. PCT/US2010/029237 dated Oct. 13, 2011.
International Search Report and the Written Opinion of the International Searching Authority dated Jun. 2, 2010 for International Application No. PCT/US2010/029237.
Merriam Webster Website, Definition of "retrofit" retrieved from http://www.merriam-webster.com/dictionary/retrofit on Dec. 15, 2011.
Merriam Webster Website, Synonyms of "alert" retrieved from http://www.merriam-webster.com/thesaurus/alert on Dec. 15, 2011.

(Continued)

*Primary Examiner* — Christle I Marshall
(74) *Attorney, Agent, or Firm* — Michael A. Springs; Moore & Van Allen PLLC; Peter B. Stewart

(57) ABSTRACT

Embodiments of the present invention provide a system for processing deposits of resources. A managing entity generates containers with respective unique identifier tags and provides the container to a merchant. The merchant places resources in the container and scans the unique identifier tag of the container. The system receives an indication of the scan, and displays a deposit portal comprising merchant input fields. The merchant provides a merchant input into these input fields, and the merchant input is stored in a searchable database. Once the container reaches a processing center, the processing center scans the unique identifier tag, and the managing entity receives an indication that the scan occurred. In response, the managing entity system causes a processing application to display on a computing device of the processing center, the display including processing input fields that are at least partially filled out with the merchant input.

20 Claims, 4 Drawing Sheets

(56) References Cited

U.S. PATENT DOCUMENTS

| | | | |
|---|---|---|---|
| 6,028,517 A | 2/2000 | Sansone et al. |
| 6,047,807 A | 4/2000 | Molbak et al. |
| 6,055,438 A | 4/2000 | Winner et al. |
| 6,065,672 A | 5/2000 | Haycock |
| 6,082,519 A | 7/2000 | Martin et al. |
| 6,109,522 A | 8/2000 | Force et al. |
| 6,122,625 A | 9/2000 | Rosen et al. |
| 6,167,378 A | 12/2000 | Webber et al. |
| 6,260,024 B1 | 7/2001 | Shkedy |
| 6,278,795 B1 | 8/2001 | Anderson et al. |
| 6,363,164 B1 | 3/2002 | Jones et al. |
| 6,378,770 B1 | 4/2002 | Clark et al. |
| 6,483,433 B2 | 11/2002 | Moskowitz |
| 6,487,542 B2 | 11/2002 | Ebata |
| 6,491,216 B1 | 12/2002 | May |
| 6,498,603 B1 | 12/2002 | Wallace |
| 6,502,746 B1 | 1/2003 | Do et al. |
| 6,513,303 B2 | 2/2003 | Neri |
| 6,523,742 B1 | 2/2003 | Awatsu et al. |
| 6,526,273 B1 | 2/2003 | Link, II et al. |
| 6,550,221 B1 | 4/2003 | Neri |
| 6,550,671 B1 | 4/2003 | Brown et al. |
| 6,584,754 B1 | 7/2003 | Neri |
| 6,607,124 B1 | 8/2003 | Junkins et al. |
| 6,633,881 B2 | 10/2003 | Drobish et al. |
| 6,659,258 B2 | 12/2003 | Otsuka |
| 6,715,670 B1 | 4/2004 | Swiatek et al. |
| 6,736,314 B2 | 5/2004 | Cooper et al. |
| 6,788,203 B1 | 9/2004 | Roxbury et al. |
| 6,845,905 B2 | 1/2005 | Blad et al. |
| 6,848,612 B2 | 2/2005 | Uematsu et al. |
| 6,922,973 B1 | 8/2005 | Hofmann et al. |
| 6,934,688 B2 | 8/2005 | Carter |
| 6,983,836 B2 | 1/2006 | Adams et al. |
| 7,004,385 B1 | 2/2006 | Douglass |
| 7,042,360 B2 | 5/2006 | Light et al. |
| 7,076,458 B2 | 7/2006 | Lawlor et al. |
| 7,121,461 B2 | 10/2006 | Washington et al. |
| 7,149,336 B2 | 12/2006 | Jones et al. |
| 7,201,313 B1 | 4/2007 | Ramachandran |
| 7,212,992 B1 | 5/2007 | Kanevsky et al. |
| 7,216,800 B1 | 5/2007 | Ramachandran |
| 7,219,083 B2 | 5/2007 | Bellucci et al. |
| 7,232,024 B2 | 6/2007 | Mazur et al. |
| 7,243,080 B2 | 7/2007 | Bhadra |
| 7,248,160 B2 | 7/2007 | Mangan et al. |
| 7,269,279 B2 | 9/2007 | Chiles |
| 7,284,692 B1 | 10/2007 | Douglass |
| 7,334,381 B2 | 2/2008 | Mertz, II et al. |
| 7,347,358 B2 | 3/2008 | Ireland et al. |
| 7,348,886 B2 | 3/2008 | Himberger et al. |
| 7,350,230 B2 | 3/2008 | Forrest |
| 7,357,303 B2 | 4/2008 | Taniyama et al. |
| 7,375,638 B2 | 5/2008 | Light et al. |
| 7,461,780 B2 | 12/2008 | Potts et al. |
| 7,474,217 B2 | 1/2009 | Himberger et al. |
| 7,513,417 B2 | 4/2009 | Burns et al. |
| 7,513,419 B1 | 4/2009 | Crews et al. |
| 7,516,601 B2 | 4/2009 | Horiuchi |
| 7,537,153 B2 | 5/2009 | Hurwitz et al. |
| 7,559,183 B2 | 7/2009 | Bell |
| 7,577,612 B2 | 8/2009 | Waller et al. |
| 7,588,185 B2 | 9/2009 | Berquist et al. |
| 7,599,543 B2 | 10/2009 | Jones et al. |
| 7,602,956 B2 | 10/2009 | Jones et al. |
| 7,623,033 B2 | 11/2009 | Ainsworth et al. |
| 7,650,231 B2 | 1/2010 | Gadler |
| 7,659,816 B2 | 2/2010 | Wandel |
| 7,669,757 B1 | 3/2010 | Crews et al. |
| 7,714,708 B2 | 5/2010 | Brackmann et al. |
| 7,719,423 B2 | 5/2010 | Himberger et al. |
| 7,748,610 B2 | 7/2010 | Bell et al. |
| 7,778,456 B2 | 8/2010 | Jones et al. |
| 7,900,829 B1 | 3/2011 | Folk et al. |
| 7,903,863 B2 | 3/2011 | Jones et al. |
| 7,908,188 B2 | 3/2011 | Flynn et al. |
| 7,965,184 B1 | 6/2011 | Nichols et al. |
| 7,982,604 B2 | 7/2011 | Nichols et al. |
| 7,982,610 B1 | 7/2011 | Nichols et al. |
| 8,056,305 B1 | 11/2011 | Folk et al. |
| 8,078,534 B1 | 12/2011 | Nichols et al. |
| 8,094,021 B2 | 1/2012 | Nichols et al. |
| 8,276,810 B2 | 10/2012 | Cole et al. |
| 8,341,077 B1 | 12/2012 | Nichols et al. |
| 8,396,278 B2 | 3/2013 | Jones et al. |
| 8,430,303 B1 | 4/2013 | Sanders et al. |
| 8,459,540 B2 * | 6/2013 | Brindley ............... G06Q 10/06 235/375 |
| 8,469,262 B2 | 6/2013 | Mon et al. |
| 8,523,235 B2 | 9/2013 | Kwak et al. |
| 8,550,338 B1 | 10/2013 | Nichols et al. |
| 8,556,167 B1 | 10/2013 | Nichols et al. |
| 8,567,664 B2 | 10/2013 | Goodwin et al. |
| 8,571,948 B1 | 10/2013 | Nichols et al. |
| 8,577,802 B1 | 11/2013 | Nichols et al. |
| 8,600,842 B1 | 12/2013 | Sanders et al. |
| 8,601,771 B2 | 12/2013 | Folk et al. |
| 8,655,045 B2 | 2/2014 | Jones et al. |
| 8,844,804 B2 | 9/2014 | Blachowicz et al. |
| 9,004,352 B1 * | 4/2015 | Graef ................ G07D 11/0096 235/379 |
| 9,058,626 B1 | 6/2015 | Donaho |
| 9,141,876 B1 * | 9/2015 | Jones ...................... G06K 9/60 |
| 9,311,671 B2 | 4/2016 | Folk et al. |
| 9,495,705 B2 | 11/2016 | Blachowicz et al. |
| 2001/0020638 A1 | 9/2001 | Uematsu et al. |
| 2001/0042785 A1 | 11/2001 | Walker et al. |
| 2001/0051922 A1 | 12/2001 | Waller et al. |
| 2001/0054643 A1 | 12/2001 | Siemens |
| 2002/0052193 A1 | 5/2002 | Chetty |
| 2002/0052794 A1 | 5/2002 | Bhadra |
| 2002/0082994 A1 | 6/2002 | Herziger |
| 2002/0091937 A1 | 7/2002 | Ortiz |
| 2002/0095588 A1 | 7/2002 | Shigematsu et al. |
| 2002/0111916 A1 | 8/2002 | Coronna et al. |
| 2002/0120572 A1 | 8/2002 | Bellucci et al. |
| 2002/0138424 A1 | 9/2002 | Coyle |
| 2002/0194122 A1 | 12/2002 | Knox et al. |
| 2002/0195309 A1 | 12/2002 | Pope |
| 2003/0004870 A1 | 1/2003 | Van Rensburg et al. |
| 2003/0011466 A1 | 1/2003 | Samuel et al. |
| 2003/0050891 A1 | 3/2003 | Cohen et al. |
| 2003/0061153 A1 | 3/2003 | Birdsong et al. |
| 2003/0083936 A1 | 5/2003 | Mueller et al. |
| 2003/0083969 A1 | 5/2003 | Uchiyama et al. |
| 2003/0122671 A1 | 7/2003 | Jespersen |
| 2003/0163710 A1 | 8/2003 | Ortiz et al. |
| 2003/0177102 A1 | 9/2003 | Robinson |
| 2003/0208431 A1 | 11/2003 | Raynes et al. |
| 2003/0213843 A1 | 11/2003 | Jackson |
| 2003/0234719 A1 | 12/2003 | Denison et al. |
| 2003/0236589 A1 | 12/2003 | Myatt |
| 2004/0016796 A1 | 1/2004 | Hanna et al. |
| 2004/0056767 A1 | 3/2004 | Porter |
| 2004/0069591 A1 | 4/2004 | Ito |
| 2004/0083149 A1 | 4/2004 | Jones |
| 2004/0100379 A1 | 5/2004 | Boman et al. |
| 2004/0111346 A1 | 6/2004 | Macbeath et al. |
| 2004/0117302 A1 | 6/2004 | Weichert et al. |
| 2004/0124966 A1 | 7/2004 | Forrest |
| 2004/0201454 A1 | 10/2004 | Waterhouse et al. |
| 2004/0215566 A1 | 10/2004 | Meurer |
| 2004/0217162 A1 | 11/2004 | Chigira et al. |
| 2005/0011721 A1 | 1/2005 | Armanini et al. |
| 2005/0027594 A1 | 2/2005 | Yasnovsky et al. |
| 2005/0080731 A1 | 4/2005 | Dnyaneshwar |
| 2005/0091129 A1 | 4/2005 | Tien |
| 2005/0096986 A1 | 5/2005 | Taylor et al. |
| 2005/0108164 A1 * | 5/2005 | Salafia, III ............ G06Q 20/04 705/42 |
| 2005/0183928 A1 | 8/2005 | Jones et al. |
| 2005/0189266 A1 | 9/2005 | Fujita et al. |
| 2005/0258234 A1 | 11/2005 | Silverbrook et al. |
| 2005/0273347 A1 | 12/2005 | Dudley et al. |

(56) References Cited

U.S. PATENT DOCUMENTS

| | | |
|---|---|---|
| 2005/0284728 A1 | 12/2005 | Corrick et al. |
| 2006/0022032 A1 | 2/2006 | Fillinger et al. |
| 2006/0120519 A1 | 6/2006 | Tamari et al. |
| 2006/0131395 A1 | 6/2006 | Potts et al. |
| 2006/0212372 A1 | 9/2006 | Eberhard et al. |
| 2006/0247973 A1 | 11/2006 | Mueller et al. |
| 2006/0271441 A1 | 11/2006 | Mueller et al. |
| 2006/0282277 A1 | 12/2006 | Ng |
| 2006/0288233 A1 | 12/2006 | Kozlay |
| 2007/0005452 A1 | 1/2007 | Klingenberg et al. |
| 2007/0008118 A1 | 1/2007 | Kassiedass |
| 2007/0012602 A1 | 1/2007 | Baldassari et al. |
| 2007/0034683 A1 | 2/2007 | Eastman et al. |
| 2007/0045395 A1 | 3/2007 | Corona et al. |
| 2007/0063016 A1 | 3/2007 | Myatt et al. |
| 2007/0100750 A1 | 5/2007 | Hartfield et al. |
| 2007/0102439 A1 | 5/2007 | Bell |
| 2007/0109097 A1 | 5/2007 | Coutermarsh et al. |
| 2007/0151827 A1 | 7/2007 | Brandstrom et al. |
| 2007/0174156 A1 | 7/2007 | Emde et al. |
| 2007/0187485 A1 | 8/2007 | Aas et al. |
| 2007/0198341 A1 | 8/2007 | Park |
| 2007/0226142 A1 | 9/2007 | Hanna et al. |
| 2007/0228151 A1 | 10/2007 | Yokoi et al. |
| 2007/0282724 A1 | 12/2007 | Barnes et al. |
| 2008/0005019 A1 | 1/2008 | Hansen |
| 2008/0005578 A1 | 1/2008 | Shafir |
| 2008/0029949 A1 | 2/2008 | Hansson |
| 2008/0103959 A1 | 5/2008 | Carroll et al. |
| 2008/0116259 A1 | 5/2008 | Oberan |
| 2008/0120237 A1 | 5/2008 | Lin |
| 2008/0126515 A1 | 5/2008 | Chambers et al. |
| 2008/0134849 A1 | 6/2008 | McGough |
| 2008/0149706 A1 | 6/2008 | Brown et al. |
| 2008/0155269 A1 | 6/2008 | Yoshikawa |
| 2008/0158002 A1 | 7/2008 | Parkinson et al. |
| 2008/0199155 A1 | 8/2008 | Hagens et al. |
| 2008/0223930 A1 | 9/2008 | Rolland et al. |
| 2008/0236101 A1 | 10/2008 | Horiuchi |
| 2008/0249934 A1 | 10/2008 | Purchase et al. |
| 2008/0262949 A1 | 10/2008 | Bond et al. |
| 2008/0265019 A1 | 10/2008 | Artino et al. |
| 2008/0303903 A1 | 12/2008 | Bentley et al. |
| 2009/0001158 A1 | 1/2009 | Walters |
| 2009/0006249 A1 | 1/2009 | Morgan et al. |
| 2009/0006250 A1 | 1/2009 | Bixler et al. |
| 2009/0032580 A1 | 2/2009 | Blachowicz et al. |
| 2009/0034802 A1 | 2/2009 | Frei et al. |
| 2009/0051566 A1 | 2/2009 | Olsen et al. |
| 2009/0051769 A1 | 2/2009 | Kuo et al. |
| 2009/0065573 A1 | 3/2009 | Potts et al. |
| 2009/0107800 A1 | 4/2009 | Nishida et al. |
| 2009/0114716 A1 | 5/2009 | Ramachandran |
| 2009/0140039 A1 | 6/2009 | Force et al. |
| 2009/0164364 A1 | 6/2009 | Galit et al. |
| 2009/0187482 A1 | 7/2009 | Blount et al. |
| 2009/0216662 A1 | 8/2009 | Crist et al. |
| 2009/0242626 A1 | 10/2009 | Jones et al. |
| 2010/0052844 A1 | 3/2010 | Wesby |
| 2010/0076853 A1 | 3/2010 | Schwarz |
| 2010/0116619 A1 | 5/2010 | Jones |
| 2010/0274723 A1 | 10/2010 | Joao |
| 2014/0166745 A1 | 6/2014 | Graef et al. |
| 2014/0339301 A1 | 11/2014 | Angus |
| 2015/0095203 A1 | 4/2015 | Howe |
| 2015/0098642 A1 | 4/2015 | Jacomet et al. |

FOREIGN PATENT DOCUMENTS

| | | |
|---|---|---|
| DE | 19512045 A1 | 10/1996 |
| DE | 19846452 A1 | 12/1999 |
| DE | 20013021 U1 | 1/2001 |
| DE | 102004039365 A1 | 2/2006 |
| DE | 102005047711 A1 | 4/2007 |
| EP | 852279 A2 | 7/1998 |
| EP | 1477949 A1 | 11/2004 |
| EP | 1486923 A2 | 12/2004 |
| GB | 2304953 A | 3/1997 |
| JP | 2008171334 A | 7/2008 |
| WO | 9933040 A1 | 7/1999 |
| WO | 03034359 A1 | 4/2003 |
| WO | WO 03046842 | 6/2003 |
| WO | 2005038623 A2 | 4/2005 |
| WO | 2005041385 A2 | 5/2005 |
| WO | 2005106722 A1 | 11/2005 |

OTHER PUBLICATIONS

PCT/US09/65281, International Search Report and Written Opinion, dated Jan. 12, 2010.
International Search Report and Written Opinion for International Application No. PCT/US2007/088650, dated Sep. 16, 2008, 10 pages.
PR_Newswire; "Airborne Express Announces New Pricing"; New York, Jan. 29, 2001.
Anonymous; "Parcel Pickup now a click away at Canada Post"; Canada Newswire; Aug. 31, 2011.
Oracle Database SQL Reference, 10g Release 1 (10.1), Part No. B10759-01, Dec. 2003.
Powerpoint Presentation, DTS Product Overview, IFS, Apr. 2006, 17 pages.
Durbin, "Ford's F-150 goes high-tech", retrieved from <http://www.wheels_ca/article/173134>, Feb. 6, 2008, 4 pages.
Monthly Minutes from Banking Technology Operations Standing Committee (BTO), dated Mar. 20, 2007, 2 pages.
Hem, "Adaptation/Loomis cashes in on technology/the armored car company defies obsolescence despite a declining use of coins and bills", Houston Chronicle, retrieved from <http://www.chron.com/CDA/archives/archive.mpl?id=2008_4523451>, Mar. 1, 2008, 2 pages.
Powerpoint Presentation, Guck, "PakTrak", Cash Shipment Package Tracking Concept Overview, Draft-Version 1.0, Mar. 14, 2008, 17 pages.
Powerpoint Presentation, RFID in Banking, May 21, 2008, 12 pages.
Monthly Minutes for RFID SIG dated Mar. 19, 2008, 2 pages.
Web link: http://www.reghardware.co.uk/2009/05/25/handset apps for blind/print.html, Phone Apps Help Blind 'see'(video), 2 pages.
Web link: http://www.knfbreadercom/products-mobile.phP; "knfbReader Mobile", 2 pages.
Web link: http//www.maccast.com/2009/07/01/maccast-2009-07-01-iphone-3gs-accessibility/; 6 pages.
Website: http://www.snaptell.comi; 1 page.
Hackman, Mark, "Hands Off with Google Goggles", Dec. 8, 2009, Web link: http://www.pcmag.com/article2/0,2817,2356786,00.asp; 4 pages.
Web link: http://braillebookstore.com/view.php?T=Pocket+Money+Brailler, Product = Pocket Money Brailler; 2 pages.
Pickens, Hugh, "Brain Port Lets the Blind 'See' With Their Tongues"; Web link: http://hardware.slashdot.org/article.pl?sid=09/08/22/2035256; 3 pages.
Caesar, "New Graphic Displays for the Blind", Dec. 22, 2004; Web link: http://www.physorg.com/news2474.html.
Website: http://www.phyaids.com/store/prodIndex.asp?idStore=1 [Products for Independent Living: Blind & Low Vision Store]; 2 pages.
MacDonald, Jay (Bankrate.com), "Changes to Currency May Help the Blind", Oct. 13, 2008; Web link: http://bankrate.com/finance/checking/changes-to-currency-may-helP-the-blind-1.aspx; 2 pages.
MacDonald, Jay (Bankrate.com), "Changes to Currency May Help the Blind", Oct. 13, 2008; Web link: http://bankrate.com/yho/news/pf/20081013_blind_currency_changes_a2.asp; 2 pages.
O'Brien, Maggie and Jordon, Steve (Omaha World-Herald), "No Single Solution to Blind-Friendly Currency", May 21, 2008, web link: http://www.acb.org/nebraska/legislation/accessible-currency/news-articles/no-single-solution-to-blind-friendly-currency.html; 5 pages.
Web link: www.halfbakery.com/idea/blind_20friendly_20currency; Blind Friendly Currency, 15 pages.

(56) References Cited

OTHER PUBLICATIONS

Website: www.acb.org/resources/index.html; American Council of the Blind Helpful Resources for Blind and Visually Impaired Persons, 4 pages.
Web link: www.abledata.com/abledata.cfm?pageid=19327&top=14673&trail=22,13134&discontinued=0, Products: Voice Output Paper Money Identifier, 2 pages.
Vicini, James (Washington, D.C.), "U.S. Court: Currency Discriminates Against the Blind", May 20, 2008, Web Link: http://www.reuters.com/article/idUSN2030825720080520, 3 pages.
eHow Contributing Writer, Web link: http://www.ehow.com/how_2043858_help-blind-arrange-currency-their.html, 2 pages.
Web link: http://en.wikipedia.org/wiki/Wired_glove [Wired Glove Information]; 3 pages.

* cited by examiner

SYSTEM FOR PROCESSING RESOURCE DEPOSITS

FIELD OF THE INVENTION

The present invention is generally directed to the field of processing deposits of resources.

BACKGROUND

Managing a resource deposit system can be a time and labor-intensive practice, as each resource item normally needs to be analyzed, verified, authenticated, and the like as it is received. This problem poses a particularly difficult challenge as the number of received resource deposits increases. Therefore, a need exists to reduce the time and labor of processing deposits through an automated system of computing and scanning devices in network communication. This need is satisfied by the system of processing resource deposits, as described herein.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for processing deposits of resources. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

For sample, illustrative purposes, system environments will be summarized. The system may involve providing a container comprising a unique identifier tag to a merchant, as well as providing a deposit application to the merchant for installation on a remote computing device of the merchant. The system may also include receiving, from the computing device of the merchant, an indication that the unique identifier tag of the container has been scanned by the computing device of the merchant. In response to receiving the indication that the unique identifier tag of the container has been scanned, the system may transmit a deposit alert over a communication channel to the computing device of the merchant, wherein the deposit alert activates the deposit application to display a deposit portal comprising input fields and a request for the merchant to provide a merchant input associated with contents of the container. Furthermore, the system may receive, from the computing device of the merchant, the merchant input associated with the contents of the container, and store the received merchant input associated with the contents of the container in a deposit database.

In some embodiments, the system may further provide a resource processing application to a resource processing center for installation on a remote computing device of the resource processing center. The system may then receive, from the computing device of the resource processing center, an indication that the unique identifier tag of the container has been scanned by the computing device of the resource processing center. In response to receiving the indication that the unique identifier tag of the container has been scanned by the computing device of the resource processing center, the system may transmit a resource processing alert over a communication channel to the computing device of the resource processing center, wherein the resource processing alert activates the resource processing application to populate one or more processing input fields with the stored merchant input associated with the contents of the container.

Some embodiments of the system include monitoring a historical resource database associated with the merchant and, in response to receiving the merchant input associated with the contents of the container, identifying a proposed deposit amount of resources associated with the contents of the container. The system may also identify, from the historical resource database associated with the merchant, a current withdrawn amount of resources associated with the merchant, wherein the current withdrawn amount of resources associated with the merchant have been requested by the merchant but are not in transit to the merchant. In response to identifying the current withdrawn amount of resources associated with the merchant, the system may transmit a deposit alteration alert over the communication channel to the computing device of the merchant, wherein the deposit alteration alert activates the deposit application to display the deposit portal and a notification to refrain from depositing a portion of the contents of the container associated with the current withdrawn amount of resources. In some embodiments, the system may cancel a transmittal of the current withdrawn amount of resources to the merchant.

The system may also be configured to monitor a historical resource database associated with the merchant and, in response to receiving the merchant input associated with the contents of the container, identify a proposed deposit amount of resources associated with the contents of the container. The system may further identify, from the historical resource database associated with the merchant, an expected withdrawn amount of resources associated with the merchant, wherein the expected withdrawn amount of resources associated with the merchant is an amount of resources expected to be withdrawn by the merchant within a predetermined period of time. In response to identifying the expected withdrawn amount of resources associated with the merchant, the system may transmit a deposit alteration alert over the communication channel to the computing device of the merchant, wherein the deposit alteration alert activates the deposit application to display the deposit portal and a notification to refrain from depositing a portion of the contents of the container associated with the expected withdrawn amount of resources.

In some embodiments of the system, the unique identifier tag of the container comprises a bar code, a quick response code, a radio frequency identification code, a near field communication code, an icon, a numeric code, an alphanumeric code, or a numerical code. The system may also, in some embodiments, provide a tamper evident seal to the container.

Finally, in some embodiments of the system, the merchant input associated with contents of the container comprises at least one of a total amount of resources in the container, a total value of the resources in the container, a quantity of a denomination of the resources in the container, an identifier of a depositor associated with the merchant, an expected date that the container will be physically deposited, a login credential of the depositor, a password, or verification data for the resources in the container.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
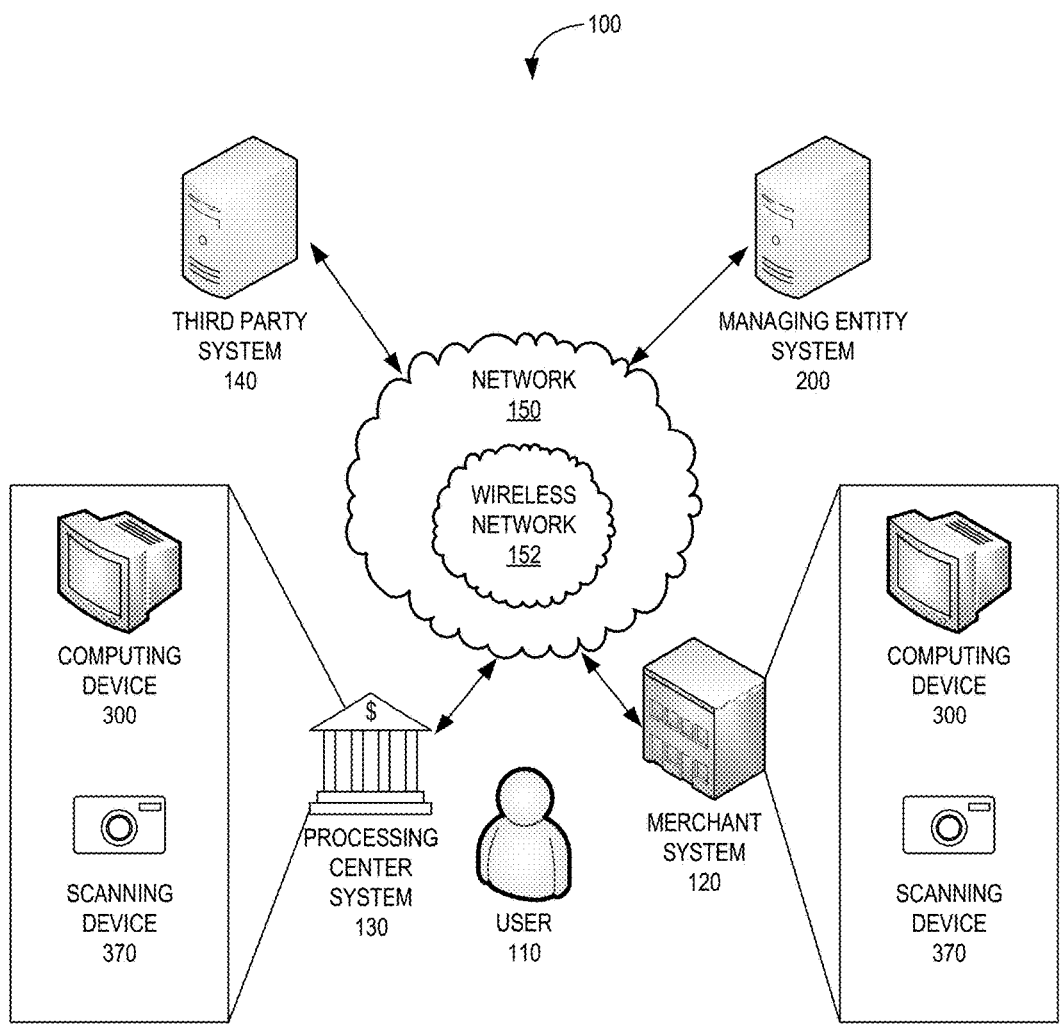
Figure 2:
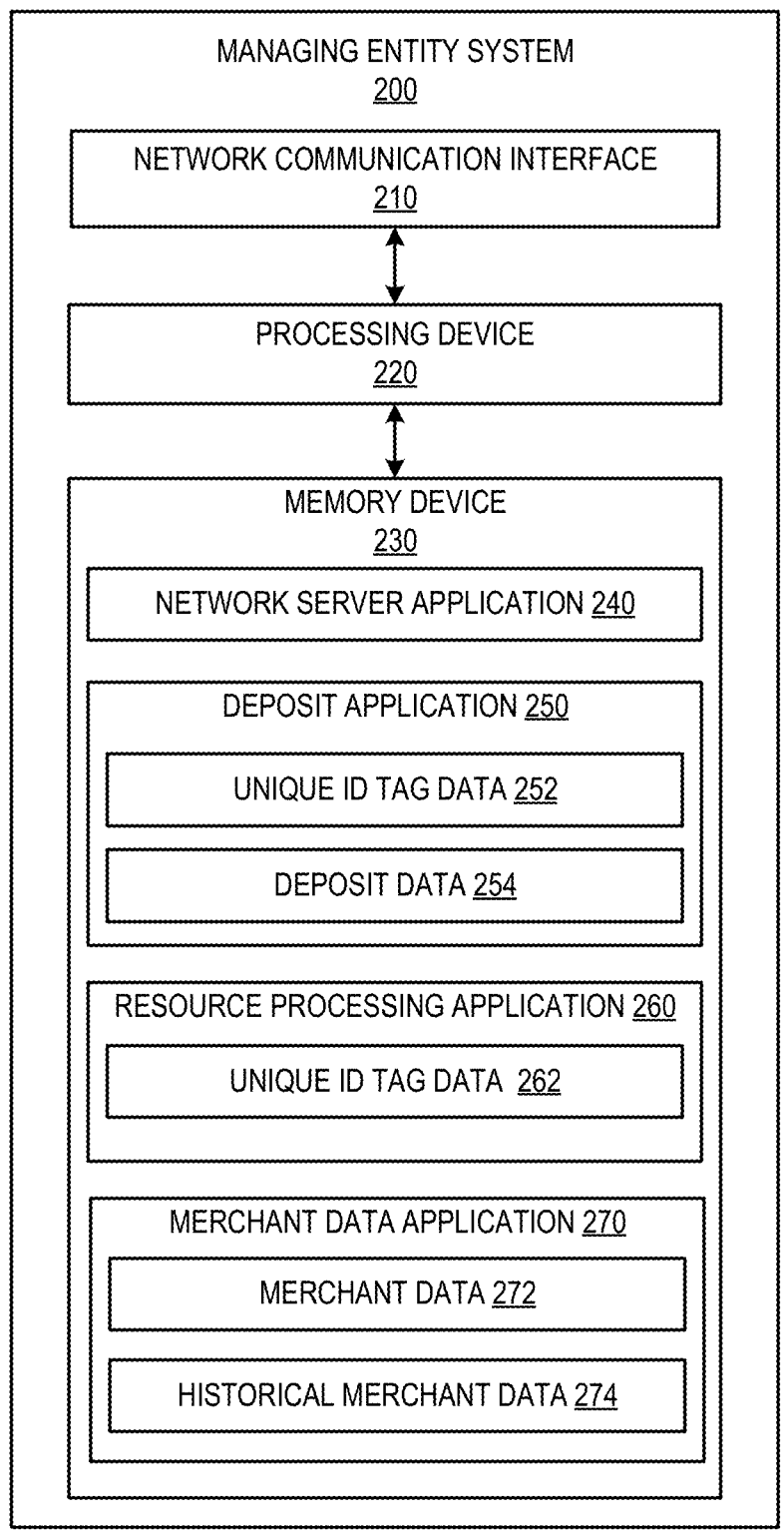
Figure 3:
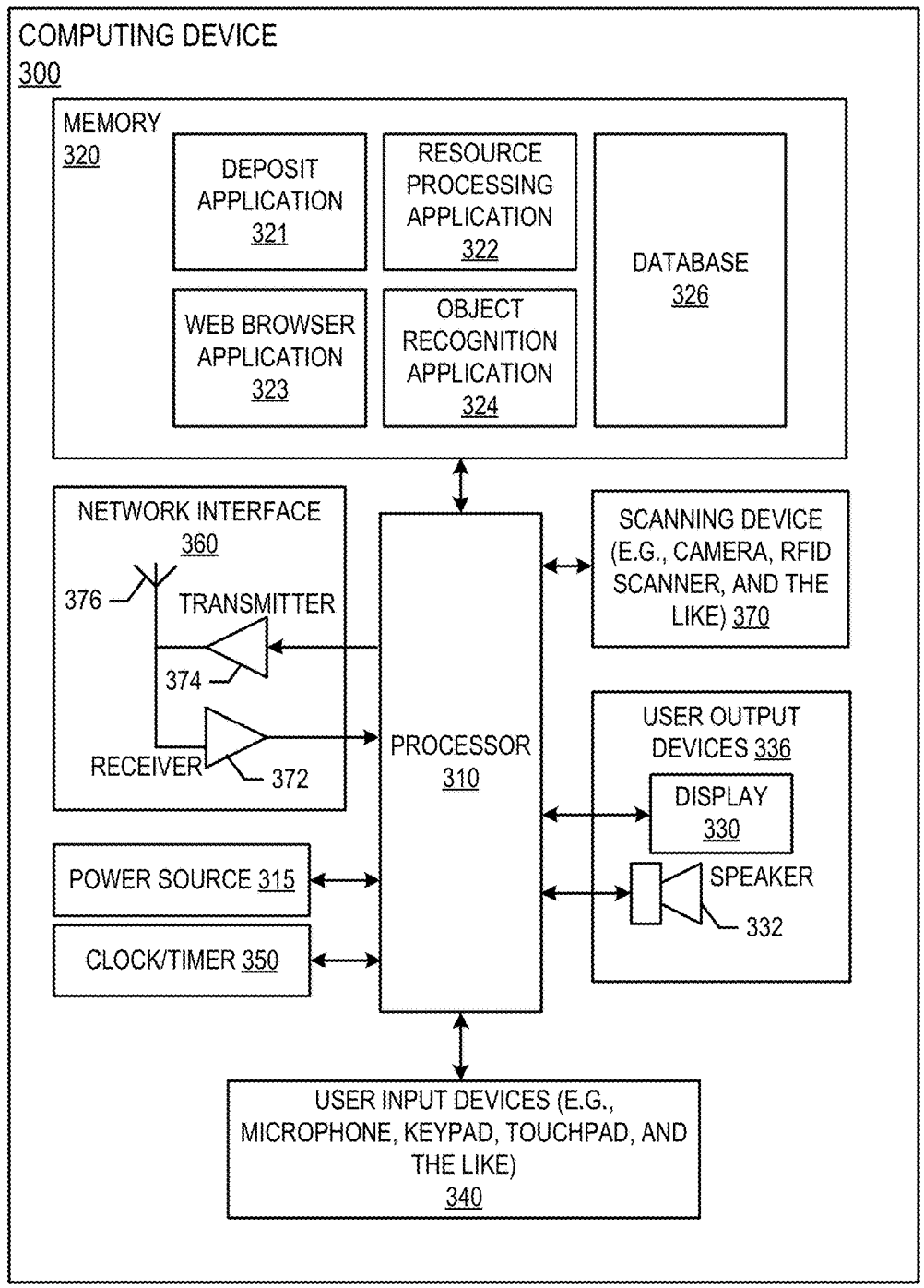
Figure 4:
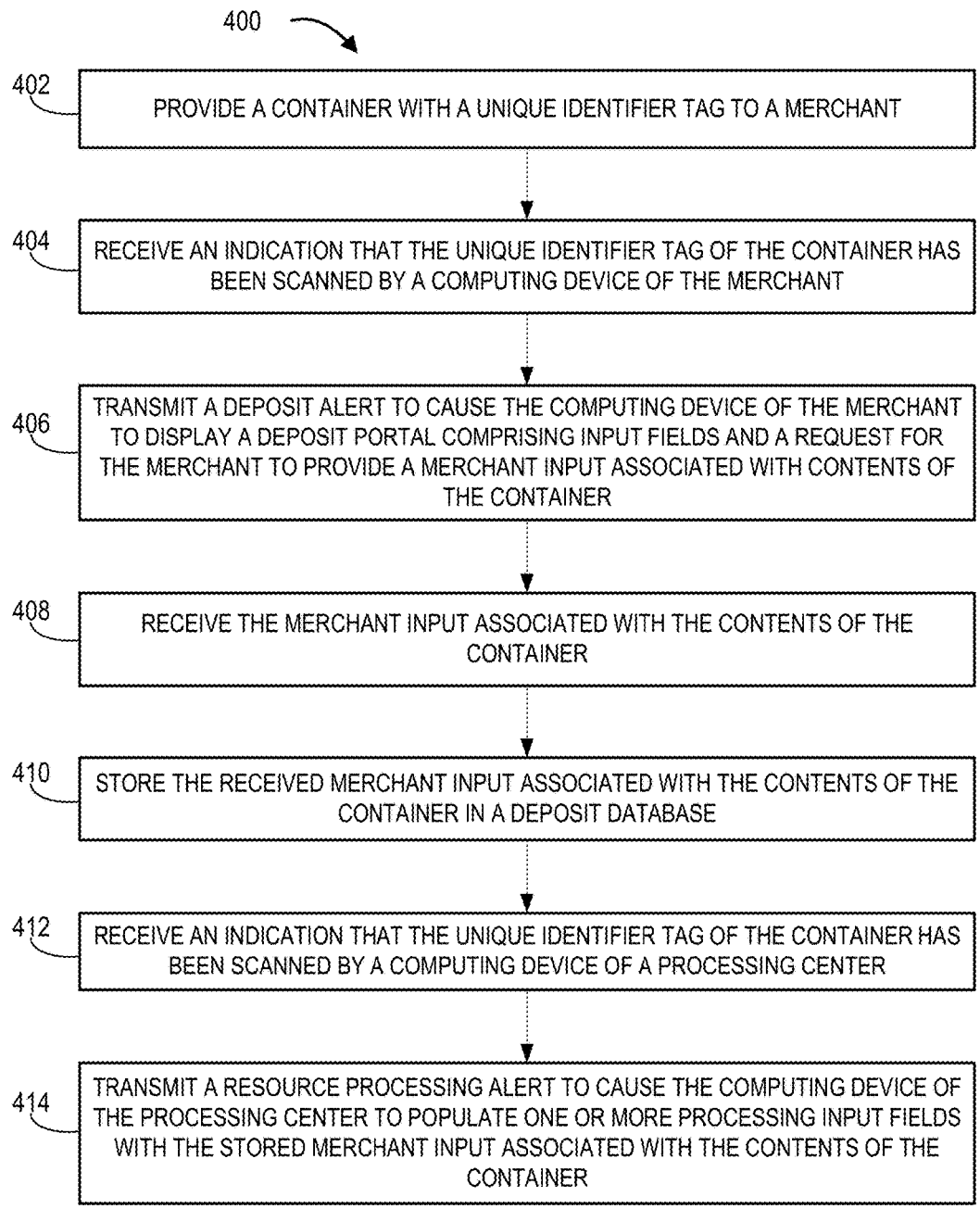

Having thus described embodiments of the invention in general terms, reference will now be made the accompanying drawings, wherein:

FIG. 1 provides a block diagram illustrating a system environment for processing deposits of resources, in accordance with an embodiment of the invention;

FIG. 2 provides a block diagram illustrating the managing entity system of FIG. 1, in accordance with an embodiment of the invention;

FIG. 3 provides a block diagram illustrating a sample computing device of FIG. 1, in accordance with an embodiment of the invention; and FIG. 4 provides a process flow for processing deposits of resources, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, the term "resources" may refer to cash, bank notes, currency, money, bonds, important items, and the like. Additionally, references to "individual resource items" may refer to individual bank notes, individual bills, specific bank notes, specific currency items, specific important items, and the like. It should be known that these terms may be interchangeable throughout the application. Likewise, any use of these terms may be interchangeable with any combination of the terms. For example, a reference to "resources" may refer to one or more bank notes as well as one or important items (e.g., documents), and the like.

Embodiments of the present invention provide a system and method for processing deposits of resources. Generally, a managing entity organizes, monitors, tracks, and otherwise controls at least portions of the processes described herein. This managing entity may be a financial institution, a logistics company or other organization, or any other entity capable of providing the products and services described herein. To begin, the managing entity may generate containers (e.g., safes, boxes, bags, straps, vehicles, and the like) and either place on or embed within each of the containers a unique identifier tag. The unique identifier tag is unique to its respective container. The managing entity may provide a container with its unique identifier tag to a merchant, or other user that may wish to deposit resources (e.g., resource notes, bank notes, cash, checks, important items, valuable items, and the like) using a container. The merchant can keep multiple containers at their location and, as they are ready to deposit resources, the merchant can place the resources in the container and scan the unique identifier tag of the container.

The managing entity system will receive an indication that the unique identifier tag has been scanned by the merchant (e.g., scanned by a computing device or scanning device of the merchant). In response to receiving this indication, the managing entity system can transmit a deposit alert to cause the computing device of the merchant to display a deposit portal comprising input fields and a request for the merchant to provide a merchant input associated with contents of the container. The merchant can input information about the deposit, the merchant's location, the merchant's intention to deposit, the contents of the deposit, and the like. Once the merchant has input the information in the field, the managing entity system may receive the merchant input associated with the contents of the container. The managing entity system may store the received merchant input associated with the contents of the container in a deposit database. This database may be searchable by the managing entity system to compare, review, and otherwise analyze the merchant input data at future points in time.

This depositing scenario may be pursuant to a contract or other agreement between the merchant (or another depositing entity) and the managing entity (or a processing entity, or any other entity that receives deposits). For example, the merchant and the managing entity may have an agreement regarding how long of a time period the merchant has to physically deposit the container after scanning the unique identifier tag of the container (e.g., several hours, one day, one week, and the like).

Once the container is deposited at a resource processing center, the processing center can perform their own scan of the unique identifier tag of the container. The managing entity system then receives an indication that the unique identifier tag of the container has been scanned by the computing device or scanning device of the processing center. In response to receiving this indication, the system will transmit a resource processing alert to cause the computing device of the processing center to populate one or more processing input fields with the stored merchant input associated with the contents of the container. As such, the system is able to automatically populate portions of the deposit input fields, including fields about whether the contents of the container have already been verified by the merchant and/or the managing entity.

The step of bypassing a verification step in a cash processing system is a technical improvement to the system of processing (i.e., receiving, identifying, verifying, and the like) deposited cash. Similarly, denominational and serial number information for the individual bank notes within the sealed container may be used by a cash processing system to bypass any steps of identifying denominations and/or serial numbers of the deposited bank notes.

While the systems and methods described herein relate primarily to processing deposits of resources, it should be known that other types of cash, money, investable materials (e.g., bonds, physical gold or other metallic or gem items, and the like), and/or documents may additionally or alternatively be included in the containers and processing methods.

FIG. 1 provides a block diagram illustrating a system environment 100, in accordance with an embodiment of the invention. As illustrated in FIG. 1, the system environment 100 includes a managing entity system 200, a merchant system 120, a processing center system 130, and a third party system 140. Additionally, the system environment 100 may comprise a user 110 that is interacting with the merchant system 120. The user 110 may represent a customer of the managing entity, a customer of a financial entity, an employee of the merchant, an employee of the processing center, and the like. The term "user" shall generally mean a person or entity that may deposit resources, withdraw funds, place resources in a container, scan a container, transfer or deliver a container comprising resources, and the like.

The managing entity system 200, the merchant system 120, the processing center system 130, and the third party system 140 may be configured to communicate over a network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In one embodiment, the network 150 includes a wireless telephone network 152.

In general, the managing entity system 200 is in network communication with other devices, such as the merchant system 120, the processing center system 130, and/or the third party system 140 via the network 150 to process deposits of resources. The managing entity system 200 may be owned by, or otherwise controlled by, a managing entity. This managing entity may be a financial entity, a security services entity, an employer, or any other entity that receives deposits of resources, provides withdrawals of resources, processes resources, and the like. The managing entity system 200 is described in more detail with respect to FIG. 2.

The merchant system 120 may comprise or include a computing device (e.g., computing device 300) and a scanning device (e.g., scanning device 370). In some embodiments, the scanning device 370 is a component of the computing device 300. For example, the scanning device 370 may be a camera component of a mobile computing device (i.e., the computing device 300 of the merchant system 120). In other embodiments, the scanning device 370 is a separate device but communicates with the computing device 300 of the merchant system via a direct communication channel (e.g., the network 150).

The scanning device 370 may be any device, signal generator, or the like, that is configured to acquire information about containers that are delivered to, processed by, and/or deposited by the merchant system 120 and/or the processing center system 130. For example, a scanning device may be, but is not limited to, a camera, a barcode scanner, a near field communication (NFC) tag scanner, a radio frequency identification (RFID) tag scanner, an infrared camera, and the like. The scanning device 370 of the merchant system 120, if it is not already a component of the computing device 300, may be in wire-line, wireless, or some other network communication with the computing device 300 of the merchant system. In this way, the computing device 300 can instruct the scanning device 370 to perform certain functions, and the scanning device 370 can be configured to automatically or periodically transmit scanned images, or other scanned data to the computing device 300. Of course, in some embodiments, the scanning device may be configured to detect a presence of a container and/or a unique identifier tag.

The computing device 300 of the merchant system 120 may be any type of computing device, including mobile computing devices, that are configured to communicate with other systems across the network 150, as well as to instruct, control, and receive data from the scanning device 370 of the merchant system 120. In some embodiments, the computing device 300 could be considered a scanning device, in that the primary or special function of the computing device 300 may be to scan unique identifier tags of containers. For example, the computing device 300 may be a mobile device, a mobile tablet device, or a barcode scanning device. In other embodiments, the computing device 300 is a laptop computer, personal computer, or another computing device that performs multiple functions that may not all relate to scanning. For example, the computing device 300 could be a checkout terminal computer, a financial branch teller station computer, and the like.

In some embodiments of the inventions, the merchant system 120 is simply configured to carry out the operations of the processes described herein, as instructed by the managing entity system 200 and/or a third party system 140. In other embodiments, the merchant system 120 is configured to provide the appropriate instructions as well as to carry out at least some of the operations necessary for the processes described herein. In some embodiments of the invention, at least a portion of the merchant system 120 is a component of the managing entity system 200. A computing device 300 like the computing device 300 associated with the merchant system 120 (including the scanning device 370) is described in greater detail with respect to FIG. 3.

The processing center system 130 may comprise one or more cash processing centers or systems, one or more physical locations of a financial institution, one or more centers or systems for receiving deposits of resources (e.g., bank notes), providing withdrawals of resources, validating the authenticity of resources, and/or the like. In some embodiments, the processing center system 130 may be a component of the managing entity system 200. For example, the managing entity may comprise a financial entity that owns or otherwise controls the processing center system 130.

The processing center system 130 may comprise a computing device 300 and a scanning device 370. As with the merchant system 120, in some embodiments, the scanning device 370 is a component of the computing device 300. In other embodiments, the scanning device 370 is a separate device but communicates with the computing device 300 of the merchant system via a direct communication channel (e.g., the network 150).

In some embodiments, the processing center system 130 may include one or more delivery vehicles (e.g. armored vans, delivery vans, and the like), and these delivery vehicles may include or comprise a computing device 300 and/or a scanning device 370. For example, a delivery vehicle of the processing center system 130 may be capable of scanning a container that it picks up from a storefront location of the merchant system 120, and immediately transmit this data, via the computing device 300, to other portions of the processing center system 130 and/or to the managing entity system 200.

The third party system 140 may be associated with one or more third party entities (e.g., a government agency, a regulatory agency, a financial institution, and the like). The third party system 140 may own or otherwise control one or more aspects of the system environment 100 (e.g., the merchant system 120 or the processing center system 130).

FIG. 2 provides a block diagram illustrating the managing entity system 200 of FIG. 1 in greater detail, in accordance with embodiments of the invention. As illustrated in FIG. 2, and in one embodiment of the invention, the managing entity system 200 includes one or more processing devices 220 operatively coupled to a network communication interface 210 and a memory device 230. In certain embodiments, the managing entity system 200 is operated by a managing entity, such as a financial institution, while in other embodiments, the managing entity system 200 is operated by an entity other than a financial institution.

It should be understood that the memory device 230 may include one or more databases or other data structures/repositories. The memory device 230 also includes computer-executable program code that instructs the processing device 220 to operate the network communication interface 210 to perform certain communication functions of the managing entity system 200 described herein. For example, in one embodiment of the managing entity system 200, the memory device 230 includes, but is not limited to, a network server application 240, a deposit application 250 that includes unique identifier tag data 252 and deposit data 254, a resource processing application 260 that includes unique identifier tag data 262, and a merchant data application 270 that includes merchant data 272 and historical merchant data 274.

The computer-executable program code of the network server application 240, the deposit application 250, the resource processing application 260, and/or the merchant data application 270 may instruct the processing device 220 to perform certain logic, data-processing, and data-storing functions of the managing entity system 200 described herein, as well as communication functions of the managing entity system 200. For example, the managing entity system 200 may be configured to cause the network communication interface 210 to instruct (and/or receive feedback from) the merchant system 120, the processing center system 130, and/or the third party system 140. In this way, the managing entity system 200 may be configured to cause the components of the system environment 100 to perform certain tasks such as providing, scanning, tracking, and processing containers of resources (e.g., bank notes or other valuable items).

The deposit application 250 may be a system, software, or other application configured to control the steps of allowing a merchant to deposit resources in a container with a unique identifier, scanning the unique identifier, and otherwise organizing the logistic aspects of the deposit. For example, the deposit application 250 may be configured to send alerts, computer readable instructions, and the like to devices within the system that will then carry out the steps of scanning a unique identifier tag of a depositing container, allow an associated user to provide input regarding the contents of the container, and setting up a delivery plan or schedule for fully depositing the container.

As mentioned above, in one embodiment, the deposit application 250 includes unique identifier tag data 252 and deposit data 254. The unique identifier tag data 252 may be any data associated with one or more unique identifiers, including information about what known unique identifier tags exist, time-based information about when unique identifier tags have been created and/or scanned, location data about unique identifier tags, and the like. The deposit data 254 may include any data or information about the location where a container is scanned to find the unique identifier tag data, information about contents of a scanned container, user input (e.g., input from a merchant user and/or input from a processing center user), and the like. This information can be stored within the memory device 230 in a way that makes the data and information easily searched in response to a request or determination for a need to compare, match, or extract data associated with deposits and unique identifier tags.

The resource processing application 260 may be a system, software, or other application configured to control the steps of processing a container at a resource processing center 170. The resource processing application 260 may include unique identifier tag data 262. This unique identifier tag data 262 may be the same as (or include at least a portion of) the unique identifier tag data 252 of the deposit application 250. In some embodiments, the unique identifier tag data 262 may comprise data that is particularly relevant for or to the resource processing center 130.

The merchant data application 270 may be a system, software, or other application configured to control the steps of acquiring, comparing, and analyzing information about one or more merchants associated with the managing entity system 200. As such, the merchant data 272 may include real-time information about the merchant, the merchant locations, deposits currently being executed, deposits requested, merchant invoices (particularly with respect to deposits), merchant requests for withdrawals, and the like. Additionally, the historical merchant data 274 may be an archive of one or more sets of merchant data for each merchant associated with the managing entity system 200. For example, the historical merchant data 274 may include date and time-based information about deposits performed by the merchant, withdrawals requested and/or executed by the merchant, and other characteristics of how the merchant operated or interacted with the managing entity system over time. This historical merchant data 274, along with the merchant data 272, can be analyzed to identify trends, predict future events or action plans, and the like.

In some embodiments, the managing entity system 200 may check for the validity of resources that are deposited in containers. Therefore, the managing entity system 200 may, in some embodiments, include a resource validation application (not shown) that includes verification information (not shown). This verification information may comprise any information that is useful in assessing the validity or authenticity of any resource (e.g., bank note or other verifiable document). Furthermore, the verification information may comprise a database of information for which resources have been verified as authentic. The managing entity system 200 may then provide information to the resource processing center system 130 regarding which resources are stored within the sealed container, as well as the validity of each of those resources. In such cases, the managing entity system 200 already has a high confidence level regarding the validity of the resources, and therefore can instruct the processing center system 130 to bypass one or more resource verification steps that the processing center system 130 would normally perform on the resources that are received outside of a sealed container like those traceable sealed containers described herein.

As used herein, a "communication interface" generally includes a modem, server, transceiver, and/or other device for communicating with other devices on a network, and/or a user interface for communicating with one or more customers. The network communication interface 210 is a communication interface having one or more communication devices configured to communicate with one or more other devices on the network 150, such as the merchant system 120, the processing center system 130, and/or the third party system 140. The processing device 220 is configured to use the network communication interface 210 to transmit and/or receive data and/or commands to and/or from the other devices connected to the network 150.

FIG. 3 provides a block diagram illustrating at least a portion of a computing device 300, as illustrated with respect to the merchant system 120 and/or the processing center system 130 in FIG. 1. While referred to as a "device," it should be known that the computing device 300 may comprise a system in and of itself (e.g., multiple devices in network communication, multiple components configured to send and receive data, information, alerts, signals, command signals, control signals, and the like) configured to perform one or more functions of the invention described herein. The merchant system 120 and/or the processing center system 130 may comprise multiple computing devices 300 in the forms of computers, laptop computers, mobile devices, telephones, scanning devices (e.g., scanning device 370), point of sale transaction devices, self-checkout devices, financial safe devices, or any other computing devices configured to perform one or more functions of the systems and methods described herein for processing deposits of resources.

Some embodiments of the computing device 300 include a processor 310 communicably coupled to such devices as a memory 320, user output devices 336, user input devices 340, a network interface 360, a power source 315, a clock or other timer 350, and/or one or more scanning devices 370 (e.g., cameras, radio frequency identification (RFID) scanners, barcode scanners, quick response (QR) code scanners, near frequency communication (NFC) chip scanners, and the like). Of course, as mentioned above, one or more scanning device 370 may be a separate physical device from the computing device 300. In such embodiments, the scanning device 370 may be in network communication with the computing device 300. For example, a merchant may have a mobile scanning device 370 that the merchant uses to scan unique identifier tags of containers to be used to deposit resources. The mobile scanning device 370 may be configured to automatically transmit control signals to the merchant's computing device 300 in direct response to scanning the unique identifier tag of the container, whereby the transmitted control signals cause the computing device 300 to perform one or more functions (e.g., cause the display 330 to present a deposit portal with input fields and a request for the merchant's input, transmit information regarding the scanned unique identifier tag to the managing entity system 200, and the like).

The processor 310, and other processors described herein, generally include circuitry for implementing communication and/or logic functions of the computing device 300. For example, the processor 310 may include a digital signal processor device, a microprocessor device, and various analog to digital converters, digital to analog converters, and/or other support circuits. Control and signal processing functions of the computing device 300 are allocated between these devices according to their respective capabilities. The processor 310 thus may also include the functionality to encode and interleave messages and data prior to modulation and transmission. The processor 310 can additionally include an internal data modem. Further, the processor 310 may include functionality to operate one or more software programs, which may be stored in the memory 320. For example, the processor 310 may be capable of operating a connectivity program, such as a web browser application 323. The web browser application 323 may then allow the computing device 300 to transmit and receive web content, such as, for example web page content, according to a Wireless Application Protocol (WAP), Hypertext Transfer Protocol (HTTP), and/or the like.

The processor 310 is configured to use the network interface 360 to communicate with one or more other devices on the network 150. In this regard, the network interface 360 includes an antenna 376 operatively coupled to a transmitter 374 and a receiver 372 (together a "transceiver"). The processor 310 is configured to provide signals to and receive signals from the transmitter 374 and receiver 372, respectively. The signals may include signaling information in accordance with the air interface standard of the applicable cellular system of the wireless telephone network 152. In this regard, the computing device 300 may be configured to operate with one or more air interface standards, communication protocols, modulation types, and access types. By way of illustration, the computing device 300 may be configured to operate in accordance with any of a number of first, second, third, and/or fourth-generation communication protocols and/or the like. For example, the computing device 300 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 3GPP protocols and/or the like. The computing device 300 may also be configured to operate in accordance with non-cellular communication mechanisms, such as via a wireless local area network (WLAN) or other communication/data networks. Of course, the network interface 360 may also comprise a wireline connection to at least a portion of the network 150.

As described above, the computing device 300 has a user interface that is, like other user interfaces described herein, made up of user output devices 336 and/or user input devices 340. The user output devices 336 can include a display 330 (e.g., a liquid crystal display, an organic light-emitting diode display, or the like) and a speaker 332 or other audio device, which are operatively coupled to the processor 310. The user input devices 340, which allow the computing device 300 to receive data from a user such as the user 110, may include any of a number of devices allowing the computing device 300 to receive data from the user 110, such as a keypad, keyboard, touch-screen, touchpad, microphone, mouse, joystick, other pointer device, button, soft key, and/or other input device(s).

The computing device 300 may also include a scanning device 370 (or be in network communication with a scanning device 370), such as a digital camera, an NFC chip reader, an RFID tag reader, a barcode scanner, a QR code reader, and the like. In some embodiments, the scanning device 370 may be positioned such that a unique identifier tag of a container interacting with the computing device can be easily scanned as the container is deposited, withdrawn, or otherwise processed. For example, the computing device may be operatively coupled with a container receptacle, and the scanning device 370 is positioned such that the unique identifier tag of the container is scanned as the container is placed into the container receptacle. In other embodiments, the scanning device 370 has a wire-line connection with the computing device, such that a user may position the scanning device 370 in a desired position to scan the unique identifier tag of the container. In still other embodiments, the scanning device 370 may be a separate device from the computing device 300, and is in wireless network communication with the computing device 300 to receive instructions on how and when to operate, and to transfer scanned images or other acquired data.

The computing device 300 further includes a power source 315, such as a battery or power line, for powering various circuits and other devices that are used to operate the computing device 300. Embodiments of the computing device 300 may also include a clock or other timer 350 configured to determine and, in some cases, communicate actual or relative time to the processor 310 or one or more other devices.

The computing device 300 also includes a memory 320 operatively coupled to the processor 310. As used herein, memory includes any computer readable medium (as defined herein below) configured to store data, code, or other information. The memory 320 may include volatile memory, such as volatile Random Access Memory (RAM) including a cache area for the temporary storage of data. The memory 320 may also include non-volatile memory, which can be embedded and/or may be removable. The non-volatile memory can additionally or alternatively include an electrically erasable programmable read-only memory (EEPROM), flash memory or the like.

The memory 320 can store any of a number of applications which comprise computer-executable instructions/code executed by the processor 310 to implement the functions of the computing device 300 and/or one or more of the process/method steps described herein. For example, the memory 320 may include such applications as a deposit application 321, a resource processing application 322, a web browser application 323, and/or an object recognition application 324. These applications also typically provide a graphical user interface (GUI) on the display 330 that allows a user (e.g., the user 110) to view notifications and provide input to the computing device 300 and/or other devices or systems.

The memory 320 can also store any of a number of pieces of information and data in the database 326. The database 326 used by the computing device 300 and the applications and devices that make up the computing device 300 or are in communication with the computing device 300 to implement the functions of the computing device 300 and/or the other systems described herein. For example, the database 326 may include such data as merchant information, merchant input, processing center information, processing center input, scanning data, unique identifier tag data, historical transaction data, withdrawal data, deposit data, user authentication information, resource validation data, alert data, and the like.

The deposit application 321 may be provided to the computing device 300 by the managing entity system 200. For example, the managing entity system 200 may provide the deposit application to a merchant for installation on the merchant's computing device 300 for future use. The deposit application 321 may be configured to be triggered by one or more alerts to cause the computing device 300 to perform one or more functions of the processes described herein. For example, the managing entity system 200 may transmit a deposit alert to the computing device 300 in response to receiving a scan of a unique identifier tag of a container. The deposit alert may activate the deposit application 321 to cause the computing device 300 to display (e.g., via the display 330) a deposit portal comprising input fields and a request for the merchant to provide a merchant input associated with contents of the scanned container.

In some embodiments, the deposit application 321 may be configured to perform one or more actions in response to the computing device 300 receiving a deposit alteration alert. For example, the deposit alteration alert may cause the deposit application 321 to activate and cause the display 330 of the computing device 300 to present the deposit portal along with a notification to refrain from depositing a portion of the contents in the container.

The resource processing application 322 may be provided to the computing device 300 by the managing entity system 200. For example, the managing entity system 200 may provide the resource processing application 322 to a processing center for installation on a computing device 300 of the processing center system 130. The resource processing application 322 may be configured to be triggered by one or more alerts to cause the computing device 300 to perform one or more functions of the processes described herein. For example, the managing entity may transmit a resource processing alert to the computing device 300 in response to receiving a scan of a unique identifier tag of a container from the processing center system 130. The resource processing alert may activate the resource processing application 322 to cause the computing device 300 to populate (e.g., add, write in, and the like) one or more processing input fields of a depositing portal with certain data or information (e.g., a merchant input associated with contents of a container).

The object recognition application 324 may instruct one or more components of the computing device 300 to detect, measure, analyze, or otherwise identify information found on (or associated with) an image or scan of resources. For example, the object recognition application 324 may cause a camera scanning device 370 to acquire an image of a unique identifier tag or a received bank note, where the image of the received bank note (or any other resource) can then be analyzed by the object recognition application 324 to identify one or more useful features of the received bank note. In some embodiments, the object recognition application 324 and/or other applications in the computing device 300 may be configured to identify denominations of received currency, serial numbers of received currency, and/or make determinations on the validity of received currency. In some embodiments, the object recognition application 324 comprises or uses an optical character recognition process to identify the useful information (e.g. the unique identifier tag, a denomination of a bank note, and the like). In some embodiments, the object recognition application 324 associates identified information with one or more templates comprising input fields. For example, the object recognition application 324 may identify a unique identifier tag number and populate an input field for an electronic deposit with that unique identifier.

Referring now to FIG. 4, a flowchart is provided to illustrate one embodiment of a process 400 for processing resource deposits, in accordance with embodiments of the invention. In some embodiments, the process 400 may include block 402, where the system provides a container with a unique identifier tag to a merchant.

As used herein, the term "container" may refer to any box, bag, packet, strap, band, envelope, shrink wrap, netting, lockbox, safety deposit box, or any other container that is configured to securely store the contents of the container (e.g., resources, resource notes, bank notes, valuable items, and the like). In some embodiments, the container is closed, and possibly locked if locking the container is desired. Generally, the container is configured to securely hold its contents in a manner that prevents or at least reduces the likelihood of destruction or other compromising incidents of the contents within the container. In this way, a user can expect that the contents initially placed in the container will be the same valid contents once the container is opened at a later point in time.

As used herein, the term "unique identifier tag" refers to, and can include, any type or combination of codes, images, signals, and the like that uniquely identifies a container such that a managing entity can have a high level of confidence or certainty that a container scanned at a first location at a first time point, and a container scanned at a second location at a second time point are the same container if they provide the same unique identifier tag. In this way, the system can monitor and track containers (and their contents) over geographical distances, across multiple network nodes, and over periods of time. The unique identifier tag may include, but is not limited to, a bar code, a quick response (QR) code, a radio frequency identification (RFID) code, a near field communication (NFC) code, an icon, a numeric code, an alphanumeric code, a numerical code, and the like. In some embodiments, the unique identifier tag is located directly on the container. In some embodiments, the unique identifier tag is located within (or is incorporated into) the container. In some embodiments, the unique identifier tag is operatively coupled to the container.

As described in more detail below, the unique identifier tag may, on its face, provide the information about the contents and/or the validity of the contents stored in the sealed container. Additionally or alternatively, the unique identifier tag may comprise a signal that, when scanned and analyzed, provides the information regarding the contents and/or the validity of the contents stored in the sealed container. Furthermore, the unique identifier tag may comprise a signal that, when scanned and analyzed, directs a scanning device and/or a user (e.g., via a mobile device display, an ATM display, a computing device display, and the like) to a database and/or webpage that lists or otherwise provides the information regarding the contents and/or the validity of the contents stored in the sealed container.

In embodiments where the unique identifier tag comprises a GPS tag, the system may be configured to track the GPS tag over time (e.g., periodically or continuously) to monitor a location of the container. In some embodiments, the system may determine that the GPS tag is present in a location determined to be associated with compromising the contents of the sealed container. In such scenarios, the system may adjust a web-based informational notification to change the status of the contents of the container from "verified" to "cannot be verified."

The container provided to the merchant may include a tamper-evident seal that can be applied to the container once the contents of the container are in place and the container is closed. The tamper-evident seal may be placed in one or more locations on the container in such a manner that the container cannot be opened and/or the contents within the container cannot be compromised without the tamper-evident seal revealing such an event. For example, if the container is a box with a flap, the tamper-evident seal may be placed across the flap in such a manner that the contents of the box container cannot be accessed or otherwise compromised without the tamper-evident seal being damaged, displaced, or the like. In this way, a subsequent recipient of the sealed container can be confident that the contents of the sealed container have not been compromised as long as the tamper-evident seal is still intact. The tamper-evident seal, in some embodiments, may be the same as (or may be a significant component of) the container. For example, a currency strap (possibly used in conjunction with a shrink wrap or other container) may provide container characteristics and additionally provide a tamper-evident seal.

In some embodiments, the system may provide a deposit application to the merchant for installation on a remote computing device of the merchant. The deposit application may include instructions on which steps to perform (or which steps to cause another device to perform) in response to receiving an alert signal from a managing entity system. The alert signal from the managing entity system may cause the deposit application of the remote merchant computing device to activate and perform these steps.

In some embodiments, the process 400 includes step 404, where the system receives an indication that the unique identifier tag of the container has been scanned by a computing device of the merchant. This indication may be associated with depositing the container comprising the unique identifier tag, so this indication that the tag has been scanned can be viewed by the managing entity system as a notification that the container (and its contents) are being deposited and/or as a request to provide deposit information associated with the container.

The scanning device of the merchant computing device may be configured to automatically transmit the indication or notification to the computing device of the merchant and/or the overall managing entity system in direct response to detecting a unique identifier tag. Furthermore, the scanning device and/or the computing device of the merchant can provide additional information along with the indication that the unique identifier tag has been scanned. For example, information about the type of container, the location of the container, the time of day that the scan took place, the date of the scan, the merchant's name or another identifiable characteristic of the merchant (e.g., store number, and the like), a deposit type, and the like can be transmitted automatically along with the indication of a successful tag scan.

Additionally, in some embodiments, the process 400 includes block 406, where the system transmits a deposit alert to cause the computing device of the merchant to display a deposit portal comprising input fields and a request for the merchant to provide a merchant input associated with contents of the container. For example, the system may, in response to receiving the indication that the unique identifier tag of the container has been scanned, transmit the deposit alert over a communication channel to the computing device of the merchant, wherein the deposit alert activates the deposit application to display a deposit portal comprising input fields and a request for the merchant to provide a merchant input associated with the contents of the container.

The merchant input may comprise any information, data, statistics, and the like regarding the contents of the container. For example, the merchant input may include, but is not limited to, a total amount of resources in the container (e.g., a total value of a set of bank notes in the container), a quantity of a denomination of the resources in the container (e.g., a quantity of a first denomination of bank notes, a quantity of a second denomination of bank notes, a total number of bank notes, and the like), an identifier of a depositor associated with the merchant (e.g., a name or employee number of an employee tasked with filling the container with the resources and/or depositing the container of resources), an expected date that the container will be physically deposited (e.g., a date and/or time that the merchant will bring the container to a processing center, a date and/or time that the container will be ready to be picked up by the managing entity and/or a member of the processing center, and the like). The merchant input may also include, but is not limited to, a login credential of the depositor, a password of the depositor, verification data associated with the resources in the container (e.g., authentication or validation data associated with individual bank notes that comprise the resources), and the like.

The process 400 may also include block 408, where the system receives the merchant input associated with the contents of the container receives the merchant input associated with the contents of the container. In some embodiments, the system verifies at least some of the merchant input (e.g., passwords, authorization credentials for a merchant user operating the computing device of the merchant, and the like) before storing the merchant input or otherwise carrying on with the process 400.

In some embodiments, the process 400 includes block 410, where the system stores the received merchant input associated with the contents of the container in a deposit database. The deposit database may be located on a central server (or set of servers), may be positioned at one or more regional server locations, may be in or otherwise associated with one or more merchant locations, and the like. Generally, the deposit database is searchable, such that the managing entity system can compare future input (e.g., an indication that the same unique identifier tag of the container has been scanned at a processing center) with the merchant input and associated data stored in the deposit database. In some embodiments, the system can transmit an indication to the merchant system notifying the merchant that the container is ready to be deposited, will be picked up at a certain time, can be dropped off at a processing center, and the like.

Furthermore, the merchant and the managing entity (e.g., the system) may be under a contractual obligation or have some other agreement between the parties regarding how long the merchant has to deposit the container at a processing center. The agreement may also indicate that the merchant must re-verify the contents, re-scan the container, and/or cancel the deposit if the merchant does not deposit the container within the specified amount of time. In some embodiments, this time-based restriction is conveyed to the merchant in the deposit portal. Additionally, the amount of time within which the deposit must be made may be adjusted based on factors like the amount of resources being deposited, the value of the resources being deposited, the location of the merchant (e.g., shorter time period if the merchant is within a predetermined distance from a processing center), and the like.

Shifting the focus to the processing center now, the system may provide a resource processing application to a resource processing center for installation on a remote computing device of the resource processing center. As with the deposit application of the merchant computing device, the resource processing application of the resource processing center may include instructions on which steps to perform (or which steps to cause another device to perform) in response to receiving an alert signal from the managing entity system. The alert signal from the managing entity system may cause the resource processing application of the processing center computing device to activate and perform these steps.

Additionally, in some embodiments, the process 400 includes block 412, where the system receives an indication that the unique identifier tag of the container has been scanned by a computing device of a processing center. This indication may be automatically associated with the container being physically deposited to the processing center system location. Therefore, this indication that the tag has been scanned can be viewed by the managing entity system as a notification that the container (and its contents) have been physically deposited to the processing center, and/or the processing center is beginning the task of processing the deposited container and its contents.

As with the scanning device of the merchant computing device, the scanning device of the processing center computing device may be configured to automatically transmit the indication or notification to the computing device of the processing center and/or the overall managing entity system in direct response to detecting the unique identifier tag. Furthermore, the scanning device and/or the computing device of the processing center can provide additional information along with the indication that the unique identifier tag has been scanned. For example, information about the type of container, the location of the container, the time of day that the scan took place, the date of the scan, the merchant's name or another identifiable characteristic of the processing center (e.g., store number, and the like), a deposit type, and the like can be transmitted automatically along with the indication of a successful tag scan.

Finally, the process 400 may include block 414, where the system transmits a resource processing alert to cause the computing device of the processing center to populate one or more processing input fields with the stored merchant input associated with the contents of the container. For example, the system may, in response to receiving the indication that the unique identifier tag of the container has been scanned by the computing device of the resource processing center, transmit the resource processing alert over a communication channel to the computing device of the resource processing center, wherein the resource processing alert activates the resource processing application to populate one or more processing input fields with the stored merchant input associated with the contents of the container.

In some embodiments, the system may cause the computing device of the processing center to display the processing input fields associated with the deposit of the container at the processing center. The processing input fields may generally provide information and data about the container, the processing center, the merchant, the delivery method, the time and date of the deposit, the contents of the container, information about a user of the processing center that is operating the computing device of the processing center, and the like. However, instead of making the user operating the computing device of the processing center provide each of the input fields, the system is able to extract at least some of the merchant input stored in the deposit database, and populate the respective input field of the processing computing device display. For example, the system can input the quantity of resources present in the deposited container, denomination data about the resources present in the deposited container, and the like.

Of course, the system can also provide functionality to allow the user operating the computing device of the processing center to manually input and/or edit the input fields associated with the deposit of the container. However, by automatically inputting or updating processing input fields with data extracted from or based on the merchant input, the system reduces the complexity and time requirements of processing the entire contents of the container. Furthermore, in embodiments where the container is believed to have been unaltered (e.g., a tamper-evident seal is still in place), the processing center can bypass one or more processing steps (e.g., authentication review of the contents, and the like) because those steps were performed during the initial depositing stage (e.g., the merchant had the contents authenticated before securing them in the sealed container, and the like).

Additionally or alternatively, the system may monitor a historical resource database associated with the merchant. The system can store the merchant input, merchant requests for withdrawals of funds, merchant requests for transfers of funds, and the like over time to identify trends in the data, predict future events, and the like.

In response to receiving the merchant input associated with the contents of the container, the system may identify a proposed deposit amount of resources associated with the contents of the container. The system may then identify, from the historical resource database associated with the merchant, a current withdrawn amount of resources associated with the merchant or an expected withdrawn amount of resources associated with the merchant. A current withdrawn amount of resources associated with the merchant may comprise resources that the merchant has requested to be withdrawn and delivered to a merchant location, but which the managing entity has not yet put into transit. An expected withdrawn amount of resources associated with the merchant may comprise an amount of resources expected to be withdrawn by the merchant within a predetermined period of time. For example, the historical resource database may indicate that the merchant normally makes a withdrawal of the expected withdrawn amount on a regular periodic basis (e.g., every week, every month, and the like).

In response to identifying the current or expected withdrawn amount of resources, the system may transmit a deposit alteration alert over the communication channel to the computing device of the merchant, wherein the deposit alteration alert activates the deposit application to display the deposit portal and a notification to refrain from depositing a portion of the contents of the container associated with the current or expected withdrawn amount of resources.

The system may then cancel at least a portion of a previously planned transmittal of the resources, if necessary, as the merchant will have refrained from depositing that amount of resources. In this way, the system prevents or at least limits the amount of cross shipping done between the merchant and the managing entity or a processing center, and allows a merchant to keep and make use of the resources that the merchant would otherwise have to wait to be processed and/or delivered.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

To supplement the present disclosure, this application further incorporates entirely by reference the following commonly assigned patent applications:

| U.S. patent application Ser. No. | Title | Filed On |
| --- | --- | --- |
| 15/598,574 now published as 2018/0336508 | RESOURCE GRID SYSTEM FOR TRACKING AND RECONCILING RESOURCE MOVEMENT | Concurrently herewith |
| 15/598,597 now published as 2018/0336753 | SYSTEM FOR GENERATING AND PROVIDING SEALED CONTAINERS OF TRACEABLE RESOURCES | Concurrently herewith |
| 15/598,579 now published as 2018/0336766 | SYSTEM FOR PROVIDING ON-DEMAND RESOURCE DELIVERY TO RESOURCE DISPENSERS | Concurrently herewith |
| 15/599,124 now published as 2018/0336536 | SYSTEM FOR PROVIDING REAL-TIME TRACKING OF INDIVIDUAL RESOURCE ITEMS TO IDENTIFY SPECIFIC RESOURCE TRANSFERS | Concurrently herewith |
| 15/599,129 now published as 2018/0336555 | SYSTEM FOR PROVIDING REAL-TIME TRACKING OF INDIVIDUAL RESOURCE ITEMS TO IDENTIFY UNAUTHORIZED RESOURCE TRANSFERS | Concurrently herewith |
| 15/598,589 now published as 2018-0336538 | SYSTEM FOR PROCESSING DEPOSIT OF RESOURCES WITH A RESOURCE MANAGEMENT SYSTEM | Concurrently herewith |

The invention claimed is:

1. A system for processing resource deposits, the system comprising:
    a memory device; and
    one or more processing devices operatively coupled to the memory device, wherein the one or more processing devices are configured to execute computer-readable program code to:
        provide a container comprising a unique identifier tag to a merchant;
        provide a deposit application to the merchant for installation on a remote computing device of the merchant;
        receive, from the computing device of the merchant, an indication that the unique identifier tag of the container has been scanned by the computing device of the merchant;
        in response to receiving the indication that the unique identifier tag of the container has been scanned, transmit a deposit alert over a communication channel to the computing device of the merchant, wherein the deposit alert activates the deposit application to display a deposit portal comprising input fields and a request for the merchant to provide a merchant input associated with contents of the container;
        receive, from the computing device of the merchant, the merchant input associated with the contents of the container; and
        store the received merchant input associated with the contents of the container in a deposit database.

2. The system of claim 1, wherein the one or more processing devices are further configured to execute computer-readable program code to:
    provide a resource processing application to a resource processing center for installation on a remote computing device of the resource processing center;
    receive, from the computing device of the resource processing center, an indication that the unique identifier tag of the container has been scanned by the computing device of the resource processing center; and in response to receiving the indication that the unique identifier tag of the container has been scanned by the computing device of the resource processing center, transmit a resource processing alert over a communication channel to the computing device of the resource processing center, wherein the resource processing alert activates the resource processing application to populate one or more processing input fields with the stored merchant input associated with the contents of the container.

3. The system of claim 1, wherein the one or more processing devices are further configured to execute computer-readable program code to:

monitor a historical resource database associated with the merchant;

in response to receiving the merchant input associated with the contents of the container, identify a proposed deposit amount of resources associated with the contents of the container;

identify, from the historical resource database associated with the merchant, a current withdrawn amount of resources associated with the merchant, wherein the current withdrawn amount of resources associated with the merchant have been requested by the merchant but are not in transit to the merchant;

in response to identifying the current withdrawn amount of resources associated with the merchant, transmit a deposit alteration alert over the communication channel to the computing device of the merchant, wherein the deposit alteration alert activates the deposit application to display the deposit portal and a notification to refrain from depositing a portion of the contents of the container associated with the current withdrawn amount of resources; and cancel a transmittal of the current withdrawn amount of resources to the merchant.

4. The system of claim 1, wherein the one or more processing devices are further configured to execute computer-readable program code to:

monitor a historical resource database associated with the merchant;

in response to receiving the merchant input associated with the contents of the container, identify a proposed deposit amount of resources associated with the contents of the container;

identify, from the historical resource database associated with the merchant, an expected withdrawn amount of resources associated with the merchant, wherein the expected withdrawn amount of resources associated with the merchant is an amount of resources expected to be withdrawn by the merchant within a predetermined period of time; and in response to identifying the expected withdrawn amount of resources associated with the merchant, transmit a deposit alteration alert over the communication channel to the computing device of the merchant, wherein the deposit alteration alert activates the deposit application to display the deposit portal and a notification to refrain from depositing a portion of the contents of the container associated with the expected withdrawn amount of resources.

5. The system of claim 1, wherein the unique identifier tag of the container comprises a bar code, a quick response code, a radio frequency identification code, a near field communication code, an icon, a numeric code, an alphanumeric code, or a numerical code.

6. The system of claim 1, wherein the one or more processing devices are further configured to execute computer-readable program code to provide a tamper evident seal to the container.

7. The system of claim 1, wherein the merchant input associated with contents of the container comprises at least one of a total amount of resources in the container, a total value of the resources in the container, a quantity of a denomination of the resources in the container, an identifier of a depositor associated with the merchant, an expected date that the container will be physically deposited, a login credential of the depositor, a password, or verification data for the resources in the container.

8. A computer program product for processing resource deposits, the computer program product comprising at least one non-transitory computer readable medium comprising computer readable instructions, the instructions comprising instructions for:

providing a container comprising a unique identifier tag to a merchant;

providing a deposit application to the merchant for installation on a remote computing device of the merchant;

receiving, from the computing device of the merchant, an indication that the unique identifier tag of the container has been scanned by the computing device of the merchant;

in response to receiving the indication that the unique identifier tag of the container has been scanned, transmitting a deposit alert over a communication channel to the computing device of the merchant, wherein the deposit alert activates the deposit application to display a deposit portal comprising input fields and a request for the merchant to provide a merchant input associated with contents of the container;

receiving, from the computing device of the merchant, the merchant input associated with the contents of the container; and storing the received merchant input associated with the contents of the container in a deposit database.

9. The computer program product of claim 8, wherein the computer readable instructions further comprise instructions for:

providing a resource processing application to a resource processing center for installation on a remote computing device of the resource processing center;

receiving, from the computing device of the resource processing center, an indication that the unique identifier tag of the container has been scanned by the computing device of the resource processing center; and in response to receiving the indication that the unique identifier tag of the container has been scanned by the computing device of the resource processing center, transmitting a resource processing alert over a communication channel to the computing device of the resource processing center, wherein the resource processing alert activates the resource processing application to populate one or more processing input fields with the stored merchant input associated with the contents of the container.

10. The computer program product of claim 8, wherein the computer readable instructions further comprise instructions for:

monitoring a historical resource database associated with the merchant;

in response to receiving the merchant input associated with the contents of the container, identifying a proposed deposit amount of resources associated with the contents of the container;

identifying, from the historical resource database associated with the merchant, a current withdrawn amount of resources associated with the merchant, wherein the current withdrawn amount of resources associated with the merchant have been requested by the merchant but are not in transit to the merchant;

in response to identifying the current withdrawn amount of resources associated with the merchant, transmitting a deposit alteration alert over the communication channel to the computing device of the merchant, wherein the deposit alteration alert activates the deposit application to display the deposit portal and a notification to refrain from depositing a portion of the contents of the container associated with the current withdrawn amount of resources; and canceling a transmittal of the current withdrawn amount of resources to the merchant.

11. The computer program product of claim 8, wherein the computer readable instructions further comprise instructions for:

monitoring a historical resource database associated with the merchant;

in response to receiving the merchant input associated with the contents of the container, identifying a proposed deposit amount of resources associated with the contents of the container;

identifying, from the historical resource database associated with the merchant, an expected withdrawn amount of resources associated with the merchant, wherein the expected withdrawn amount of resources associated with the merchant is an amount of resources expected to be withdrawn by the merchant within a predetermined period of time; and in response to identifying the expected withdrawn amount of resources associated with the merchant, transmitting a deposit alteration alert over the communication channel to the computing device of the merchant, wherein the deposit alteration alert activates the deposit application to display the deposit portal and a notification to refrain from depositing a portion of the contents of the container associated with the expected withdrawn amount of resources.

12. The computer program product of claim 8, wherein the unique identifier tag of the container comprises a bar code, a quick response code, a radio frequency identification code, a near field communication code, an icon, a numeric code, an alphanumeric code, or a numerical code.

13. The computer program product of claim 8, wherein the computer readable instructions further comprise instructions for providing a tamper evident seal to the container.

14. The computer program product of claim 8, wherein the merchant input associated with contents of the container comprises at least one of a total amount of resources in the container, a total value of the resources in the container, a quantity of a denomination of the resources in the container, an identifier of a depositor associated with the merchant, an expected date that the container will be physically deposited, a login credential of the depositor, a password, or verification data for the resources in the container.

15. A computer implemented method for processing resource deposits, said computer implemented method comprising:

providing, via a computer processor, a container comprising a unique identifier tag to a merchant;

providing, via a computer processor, a deposit application to the merchant for installation on a remote computing device of the merchant;

receiving, via a computer processor, from the computing device of the merchant, an indication that the unique identifier tag of the container has been scanned by the computing device of the merchant;

in response to receiving the indication that the unique identifier tag of the container has been scanned, transmitting, via a computer processor, a deposit alert over a communication channel to the computing device of the merchant, wherein the deposit alert activates the deposit application to display a deposit portal comprising input fields and a request for the merchant to provide a merchant input associated with contents of the container;

receiving, via a computer processor, from the computing device of the merchant, the merchant input associated with the contents of the container; and storing, via a computer processor, the received merchant input associated with the contents of the container in a deposit database.

16. The computer implemented method of claim 15, further comprising:

providing, via a computer processor, a resource processing application to a resource processing center for installation on a remote computing device of the resource processing center;

receiving, via a computer processor, from the computing device of the resource processing center, an indication that the unique identifier tag of the container has been scanned by the computing device of the resource processing center; and in response to receiving the indication that the unique identifier tag of the container has been scanned by the computing device of the resource processing center, transmitting, via a computer processor, a resource processing alert over a communication channel to the computing device of the resource processing center, wherein the resource processing alert activates the resource processing application to populate one or more processing input fields with the stored merchant input associated with the contents of the container.

17. The computer implemented method of claim 15, further comprising:

monitoring, via a computer processor, a historical resource database associated with the merchant;

in response to receiving the merchant input associated with the contents of the container, identifying, via a computer processor, a proposed deposit amount of resources associated with the contents of the container;

identifying, via a computer processor, from the historical resource database associated with the merchant, a current withdrawn amount of resources associated with the merchant, wherein the current withdrawn amount of resources associated with the merchant have been requested by the merchant but are not in transit to the merchant;

in response to identifying the current withdrawn amount of resources associated with the merchant, transmitting, via a computer processor, a deposit alteration alert over the communication channel to the computing device of the merchant, wherein the deposit alteration alert activates the deposit application to display the deposit portal and a notification to refrain from depositing a portion of the contents of the container associated with the current withdrawn amount of resources; and canceling a transmittal of the current withdrawn amount of resources to the merchant.

18. The computer implemented method of claim 15, further comprising:

monitoring, via a computer processor, a historical resource database associated with the merchant;

in response to receiving the merchant input associated with the contents of the container, identifying, via a computer processor, a proposed deposit amount of resources associated with the contents of the container;

identifying, via a computer processor, from the historical resource database associated with the merchant, an expected withdrawn amount of resources associated with the merchant, wherein the expected withdrawn amount of resources associated with the merchant is an amount of resources expected to be withdrawn by the merchant within a predetermined period of time; and in response to identifying the expected withdrawn amount of resources associated with the merchant, transmitting, via a computer processor, a deposit alteration alert over the communication channel to the computing device of the merchant, wherein the deposit alteration alert activates the deposit application to display the deposit portal and a notification to refrain from depositing a portion of the contents of the container associated with the expected withdrawn amount of resources.

19. The computer implemented method of claim 15, wherein the unique identifier tag of the container comprises a bar code, a quick response code, a radio frequency identification code, a near field communication code, an icon, a numeric code, an alphanumeric code, or a numerical code.

20. The computer implemented method of claim 15, wherein the merchant input associated with contents of the container comprises at least one of a total amount of resources in the container, a total value of the resources in the container, a quantity of a denomination of the resources in the container, an identifier of a depositor associated with the merchant, an expected date that the container will be physically deposited, a login credential of the depositor, a password, or verification data for the resources in the container.

* * * * *